Patented Apr. 27, 1937

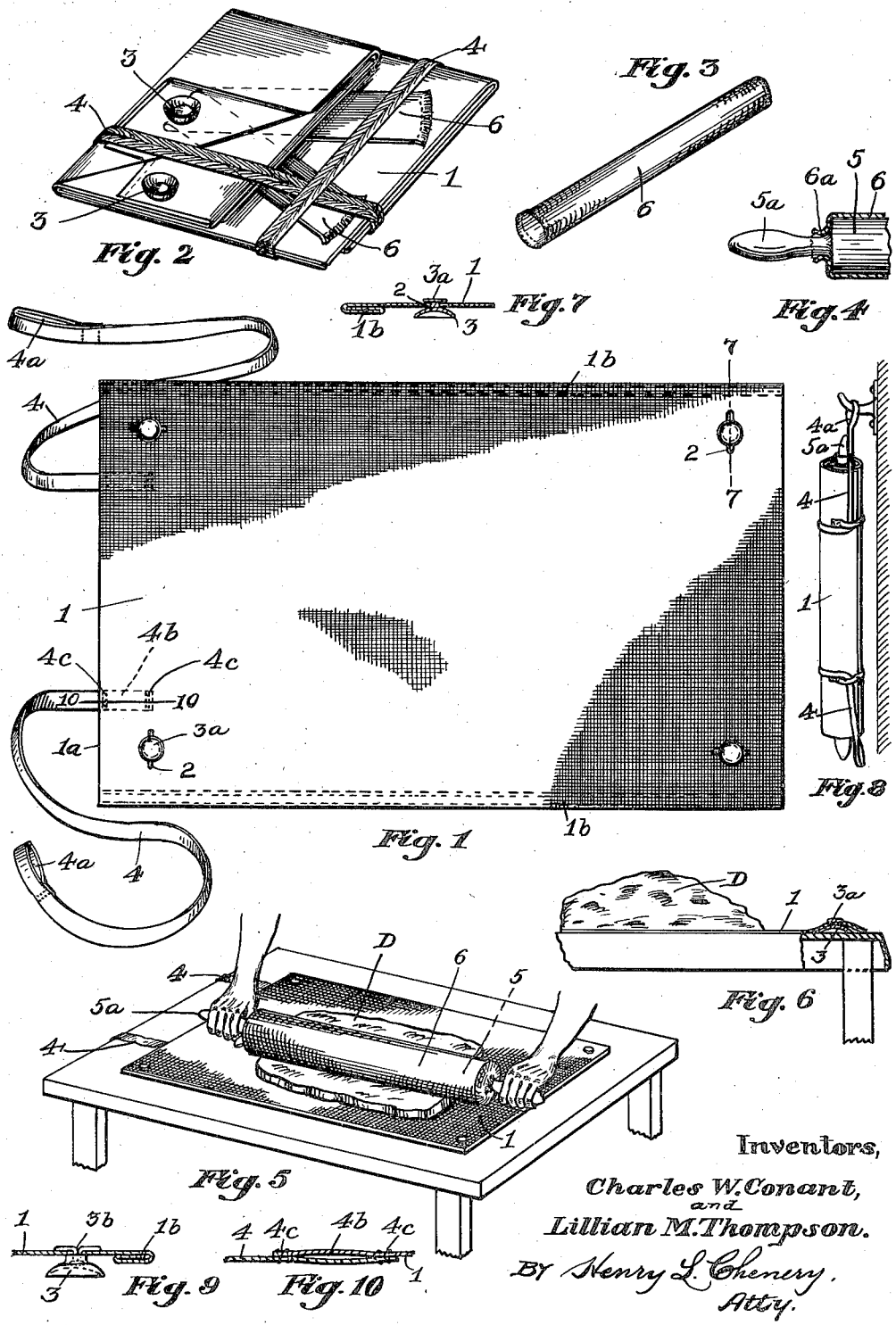

2,078,839

UNITED STATES PATENT OFFICE 2,078,839

DOUGH ROLLING APPLIANCE

Charles W. Conant and Lillian M. Thompson, Portland, Maine

Application January 9, 1936, Serial No. 58,332

3 Claims. (Cl. 107—46)

This invention relates, generally, to culinary equipment, but deals more particularly with appurtenances employed in the kitchen for rolling a batch of dough into the required thickness for making biscuits, dough-nuts, and pastry of various kinds.

Dough, as is well known to those versed in the art of cooking, readily attaches itself to the bare surfaces of an ordinary rolling-pin and bread-board, and for this reason it becomes necessary, during the dough-rolling operation, to quite frequently treat these surfaces with a thin application of flour.

Even this expedient is but palliative in character, as the flour is so easily removed from the rolling-pin or the board that portions of the batch of dough will cling to their surfaces which have become uncovered, requiring removal of the attached dough with a knife or other implement.

In the present invention we employ an elastic, fabric sleeve of stocking-leg-like appearance, which is drawn on over the rolling-pin with a tight fit. In conjunction with this fabric-covered rolling-pin element we use a fabric sheet of duck upon which to deposit the batch of dough to be rolled, the duck being disposed on any convenient table or counter.

As the modern kitchen is usually provided with an enamel top table we prefer to perform the dough-rolling operation thereon, due to the fact that this type of furniture is so easily cleaned and kept clean. This, however, is of course not absolutely essential, as any proper supporting surface will serve the purpose.

But in most instances the supporting surface on which the sheet of duck would most likely be laid in undertaking the rolling of the dough would be so smooth that the operation would be performed under difficulties were it not for the fact that we secure at each corner of the sheet a small rubber suction cup the depressing of which quite rigidly secures the sheet to the element on which it is mounted.

We also provide, as an integral part of the duck sheet two tapes employed to secure the sheet and the rolling-pin cover in a convenient and artistically folded form for marketing, and also to bind the sheet around the stocking-leg-covered rolling-pin after the device is out of service and ready to be laid aside until the next rolling operation.

It will be understood that the dough-contacting side or face of the duck sheet is concealed when the device is wrapped into out-of-service form, and that the rolling-pin cover is likewise protected from dust and dirt after the sheet has been rolled around it and securely bound by the two tapes. The whole outfit can be deposited in a drawer when not in use, or hung from a hook by one or both tapes each of which latter is provided with an end loop.

The import of the invention may more clearly be understood by reference to the accompanying drawing, taken in connection with the description found in the following specification.

In the drawing:—

Fig. 1 is a plan view of our sheet duck element forming a part of our present invention;

Fig. 2 illustrates in perspective view the sheet duck and rolling-pin cover folded into a marketing packet;

Fig. 3 is a perspective view of the rolling-pin cover;

Fig. 4 is a fragmentary, longitudinal section of the rolling-pin and fabric cover therefor;

Fig. 5 shows the application of our invention;

Fig. 6 is a fragmentary side view, partly in section, of the sheet of duck mounted on a table, with a batch of dough, as yet unrolled, disposed thereon;

Fig. 7 is a section taken on line 7—7, Fig. 1;

Fig. 8 shows the sheet of duck wrapped around the rolling-pin on which is the fabric sleeve, the whole being bound by the two tapes and suspended by one of them from a hook on a wall;

Fig. 9 shows an alternate method of securing the rubber cups, and

Fig. 10 is a section of the binding tape and pad taken on line 10—10 of Fig. 1.

Similar reference characters indicate like parts in all the different views of the drawing.

Referring to the drawing, 1 represents a sheet of fabric, preferably cotton duck of somewhat coarse weave. The coarseness of the weave provides interstices into which flour when applied in a thin coating will pass and from which it is difficult to remove it except by washing.

This sheet of duck which, for purposes of identification will hereinafter be referred to as a pastry cloth, has two edges 1a selvage, and the other two 1b hemmed, or otherwise treated to prevent raveling. For manufacturing advantages these pastry cloths are cut from a roll of the material, thus two of the edges must be bound in some manner to eliminate fraying.

Adjacent each corner of the pastry cloth is a button-hole 2 and in each of these holes is a rubber suction cup 3. The cups have a head 3a which, when assembling the cups, is passed through the button-hole, the latter closing around the neck of the cup and holding it firmly in place. We may elect to construct this suction or vacuum-cup element as illustrated in Fig. 9, embodying a split-shank rivet 3b molded or otherwise secured in the body of the cup, the shank of the rivet piercing the cloth when assembling and subsequently bent over to fasten the cup in place.

The function of the cups is to enable the pastry cloth to be held to any smooth surface, particularly enamel top tables, by a suctional grip thereof, preventing slipping or sliding about of the cloth during dough-rolling operations.

Fastened to the pastry cloth, at one end thereof, are two binding tapes 4, each having a loop 4a on its free end and a secondary loop 4b on the end made fast to the pastry cloth, as is illustrated in Fig. 10 in sectional view. The loop is formed between the tape and pastry cloth by stitching the tape to the cloth at separated points, as at 4c, 4c.

Employed in conjunction with the pastry cloth 1 in dough-rolling operations is a rolling-pin 5, having a handle 5a at each end. Drawn over and tightly fitting the body portion of the rolling-pin is a coarsely knit fabric sleeve or cover 6 which, like the pastry cloth, has a rough surface susceptible of retaining the sprinkling of flour applied to prevent sticking of the dough thereto.

The sleeve is very elastic so that it easily stretches in drawing it on over the rolling-pin body. Its short end portions extending over the ends of the rolling-pin retract sufficiently to completely cover the ends of the main part of the rolling-pin, thus preventing dough entering the space between the latter and the sleeve.

As most house-wives are provided with the conventional type of rolling-pin with which they have rolled dough in the older manner, this item is not included in the compactly folded packet illustrated in Fig. 2, including the pastry cloth and rolling-pin cover only, in which form our improved device is marketed.

The two lengths of tape, hereinbefore mentioned and identified by the numeral 4, are employed for two purposes, one, to act as binders for the packet shown in Fig. 2, and the other to serve in the same capacity when the dough-rolling operation is completed and the device is ready to be temporarily laid aside, the rolling-pin with the cover thereon being wrapped in the pastry cloth and bound with the tapes, and either put aside in a pantry drawer or suspended from a hook in the wall, as shown in Fig. 8.

The pastry cloth is folded in such a manner (see Fig. 8) that the dough-contacting side of the cloth is unexposed to dirt and dust when suspended from the hook.

The method of operating the device embodied in the present invention need be dwelt on but briefly, as the same procedure is gone through with as is followed in rolling dough D with the old-time bare rolling-pin and bread board.

The virtue in contacting the dough with a roughened, fabric surface instead of a smooth, wooden one, lies in the ability of the former to retain the thin sprinkling of flour for a greater period of time than is possible with the conventional type of dough-rolling implements. Flour prevents dough, of whatever consistency, adhering or sticking to any object with which it may come in contact. But the plain pastry cloth and rolling-pin equipped with the fabric sleeve lacks one feature which we have found quite essential when using the appliance on a smooth top or enamel top table, namely, something which will prevent the cloth sliding around when pushing and pulling the rolling-pin over the batch of dough. In the present invention the small rubber suction cups fulfill this requirement very satisfactorily.

In line with the latest ideas in hygiene and sanitation the pastry cloth and rolling-pin cover are both made of washable material so that at quite frequent intervals they may be washed and made clean.

What we claim is:

1. A dough-rolling appliance comprising in combination a pastry cloth, a plurality of vacuum cups secured to and disposed on the under side of said pastry cloth, and two binding tapes secured to said pastry cloth, said tapes having a loop on their free ends.

2. A dough-rolling appliance comprising in combination a pastry cloth constructed of a coarse woven, inelastic material, a plurality of vacuum cups secured to and on the under side of said pastry cloth, said cups being for the purpose of demountably securing said pastry cloth to a smooth supporting surface, two binding tapes, having a loop on their free ends, permanently attached to said pastry cloth, and a supplemental loop on the attaching end of said tapes adapted to receive the tapes and assist in binding said cloth when in rolled form.

3. An appliance for rolling dough for cooking purposes, comprising a coarsely woven fabric sheet, vacuum-forming cups for attaching said sheet to a smooth supporting surface by a suctional grip thereof whereby it is held against displacement from said surface during the dough-rolling operation, a binding tape, having a loop on its free end, secured to said sheet, a secondary loop formed at the attaching end of said tape made by interrupting the stitching at the point of attaching said tape to said sheet, and means to secure said cups to said fabric sheet whereby they are disposed on the under side thereof.

CHARLES WM. CONANT.
LILLIAN M. THOMPSON.